July 14, 1959    H. R. FLOREA    2,894,335
SWITCHING CIRCUIT FOR A TRAINING DEVICE
Filed May 2, 1956    5 Sheets-Sheet 1

INVENTOR.
HAROLD R. FLOREA
BY W. R. Maltby
Lawrence S. Epstein
ATTORNEYS

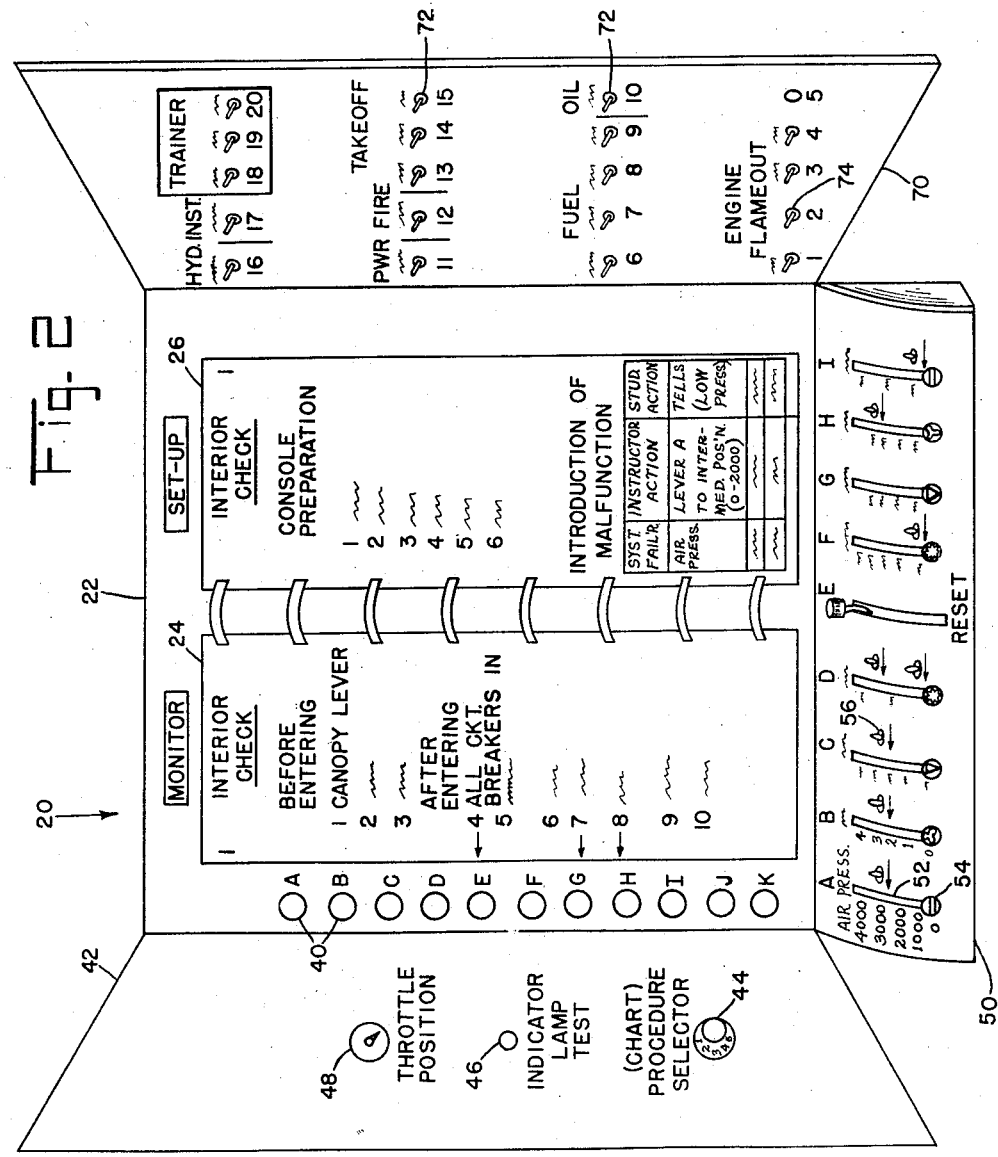

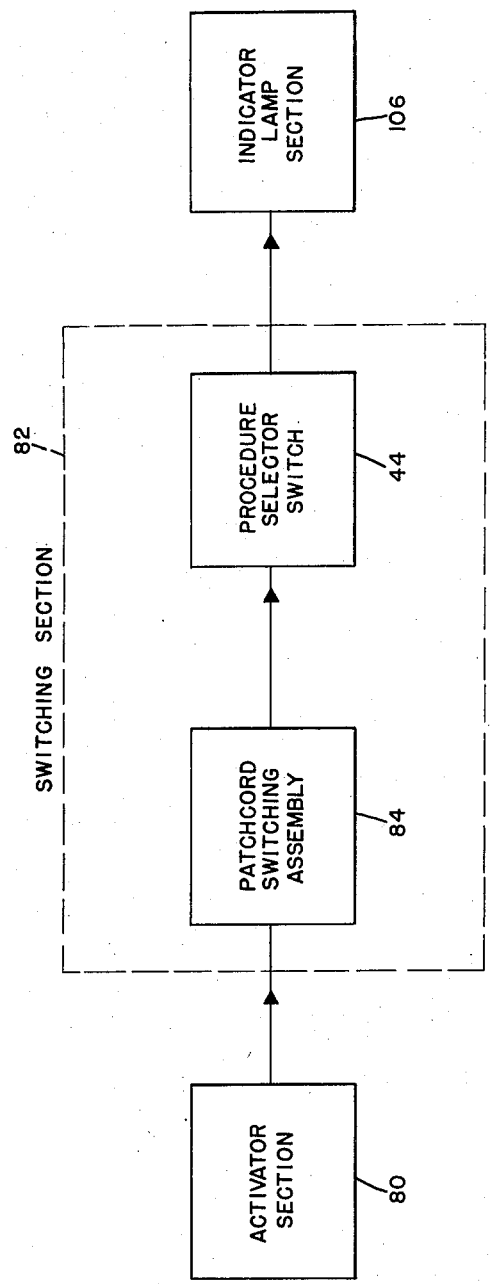

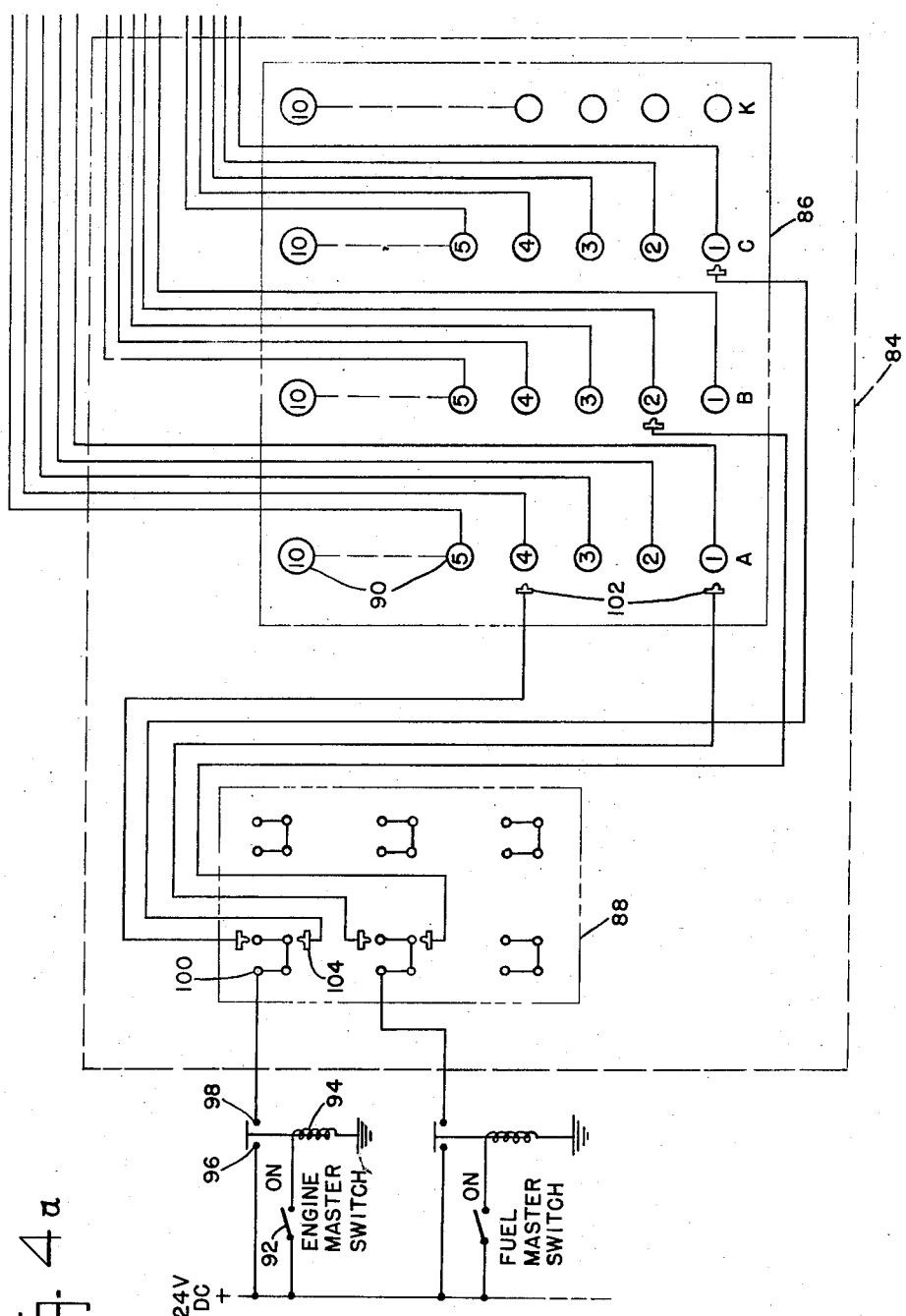

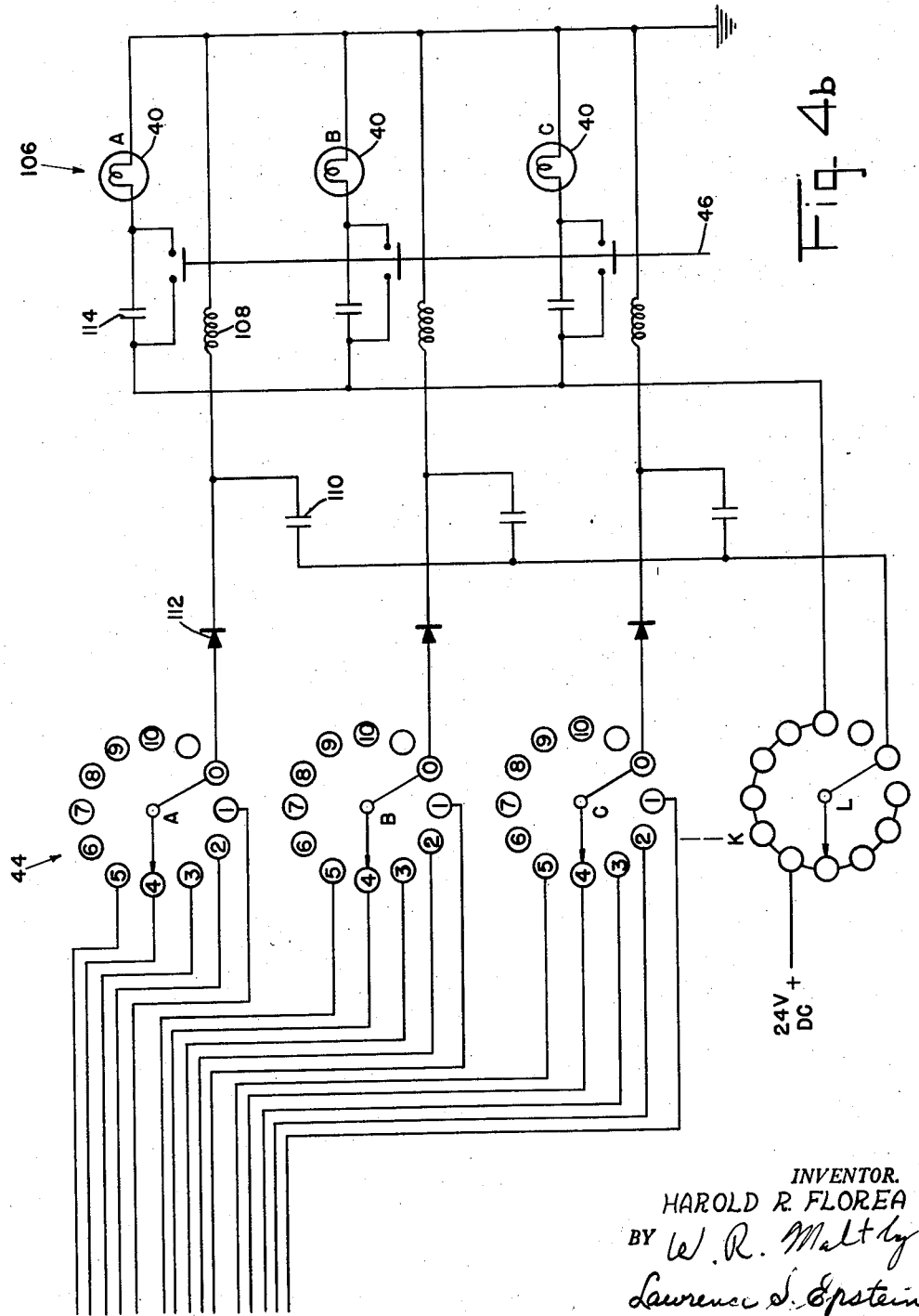

United States Patent Office 2,894,335
Patented July 14, 1959

2,894,335

SWITCHING CIRCUIT FOR A TRAINING DEVICE

Harold R. Florea, Wantagh, N.Y.

Application May 2, 1956, Serial No. 582,302

1 Claim. (Cl. 35—12)

(Granted under Title 35, U.S. Code (1952), sec. 266)

The invention described herein may be manufactured and used by or for the Government of the United States of America for governmental purposes without the payment of any royalties thereon or therefor.

This invention relates to training devices for the teaching of procedures to be followed in operating various types of apparatus and machines and especially to an instructor's console for use in conjunction with such training devices.

The invention will be explained with reference to one of its major fields of application, namely, aviation. Obviously, its use has wide applications and is not limited to the example. It is used in this field to teach the routine and emergency procedures associated with the operation of a particular aircraft. Generally, the students involved are trained pilots who are transitioning from another type of aircraft to the type which the training device is designed to stimulate, although student pilots may also be trained wtih this invention.

In accomplishing a pilot's transition from one type of aircraft to another, the modern technique is to substitute a ground trainer for the specific operational training plane until the student becomes completely familiar with all controls, instruments and equipment in the cockpit as well as all procedures which must be followed in operating the airplane, except those actually performed during flight.

The ground trainer contains an exact replica of the cockpit of the airplane which it represents. The instruments and controls of the trainer respond to the manipulations of the student in exactly the same manner as do those in the airplane. Thus, by learning the proper procedures in the ground trainer, a student can become familiar with the procedures for a particular aircraft without ever leaving the gound.

In the process of teaching procedures to a student in a ground trainer, it is desirable that an instructor be able to watch the student's manipulations and control the trainer's instruments and functional systems at his discretion, preferably from a point outside the cockpit, so that the student is not aware of the instructor's movements. Thus, some ground trainers have been provided with a remote instructor's station, including a control console, from which the instructor may operate.

Previous instructor's control consoles required a well-trained instructor and involved the use of an excessive number of indicating lamps. In addition, the configurations of previous consoles were not especially conducive to swift and facile manipulation of the controls by the instructor.

It is the primary object of this invention to provide an improved instructor's control console for devices for training a student to perform acts requiring manipulations of various controls.

Another object is to provide an improved instructor's console for such training devices, which will minimize the amount of training and degree of familiarity with the trainer which the instructor himself must have.

A further object is to provide an improved instructor's console for such training devices, which will enable the instructor to monitor the manipulations of the student and to exert control over the instruments in the trainer.

Yet another object is to provide a console configuration which will minimize the difficulty of the instructor's task.

Still another object is to provide a switching arrangement whereby the number of indicating lamps needed to indicate all the actions performed by the student in all training procedures is reduced to the number required for the procedure requiring the maximum number of actions.

A further object is to provide an improved instructor's control console which will assist a student to learn various procedures without the aid of an instructor.

Yet another object is to provide a flexible means for adapting a training device and instructor's console to accommodate procedural changes necessitated by a modification of the device which the training device simulates, or by a philosophical alteration in a procedure.

The present invention is an improved version of an instructor's console for training devices of the type which is utilized to teach students operational procedures requiring manipulations of various controls. In its preferred embodiment, the invention comprises a control console for a ground procedure aviation trainer although other embodiments are perfectly feasible for use with automobile driving trainers, or trainers for teaching the operation of sundry complicated manufacturing machines.

The console includes a control panel arranged in sections in which various controls, indicator lamps and switches are most conveniently grouped. Monitoring and set-up instruction sheets for each training procedure are arranged in a loose-leaf binder and secured to the panel adjacent to the indicator lamps so that each step (action) in a given procedure is associated with a different one of the lamps.

A switching arrangement including a multi-section, multi-contact procedure selector switch and a patchcord switching assembly permits the same group of indicator lamps to be arranged to indicate, in a definite sequence for each procedure switch position, a different series of actions completed by the trainee. It also provides for quick and flexible rearrangement of lamp-and-action combinations when a procedure must be altered or a new procedure must be introduced. The result is a minimization of the total number of lamps required to indicate the performance of all steps in all procedures to the number of lamps required for the procedure having the greatest number of steps.

A number of push-pull controls are provided to enable the instructor to control the readings on the instruments in the cockpit of the trainer. Features of the present invention include coding of the push-pull control knobs by color and shape and fixed mechanical preset stops at the positions in which the controls should be placed for normal instrument readings. These features permit the instructor to manipulate the controls without diverting his attention from the lamps and instruction sheets.

A group of switches are provided for interjecting various malfunction indications on the cockpit instruments in simulation of the different malfunctions to which the airplane is subject.

A further feature of the invention is a test switch whereby all lamps may be simultaneously tested for operativeness.

The arrangement of the various sections of the control panel and the disposition of the lamps, instruction sheets, switches and controls permit rapid, facile control of the console while the instructor is monitoring the student's activities.

Other objects and many of the attendant advantages of this invention will be readily appreciated as the same becomes better understood by reference to the following detailed description when considered in connection with the accompanying drawings wherein:

Fig. 2 is a more detailed perspective view of the instructor's console illustrated in Fig. 1;

Fig. 3 is a block diagram of the indicator lamp system employed in the invention;

Figs. 4a and 4b illustrate, partially by means of block diagram and partially by schematic circuit diagram, one embodiment of the indicator lamp system.

Figure 1:
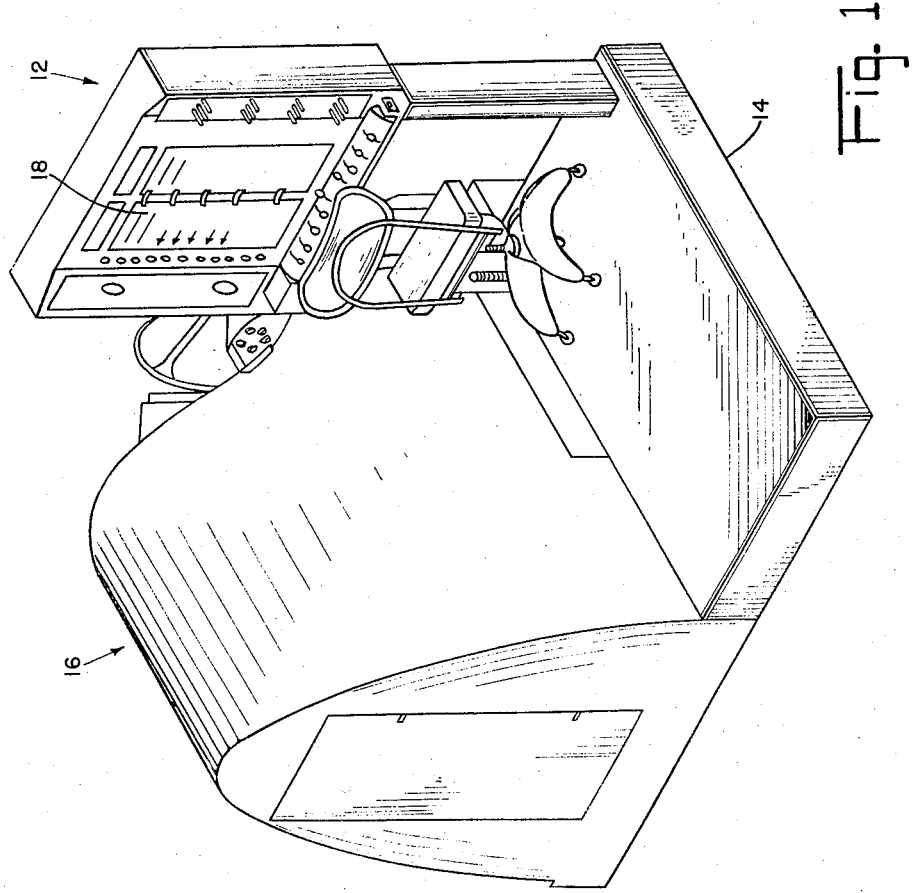
Fig. 1 is a perspective view of a preferred embodiment of the invention in conjunction with its associated ground procedure trainer.

In Fig. 1, an instructor's control console 12 is mounted at one end of a supporting base 14. The base 14 may be movable so that it can be spaced from its associated ground procedure trainer 16 for remote operation, if desired. The preferred position is as shown, however, with the console 12 adjacent the cockpit of the trainer 16. In this position, the instructor can watch the student and can converse with him, if necessary. The student may also train himself since the control console 12 is close enough in this position to enable the student to read the procedure chart 18, mounted on the console 12.

A more detailed view of the control panel 20 of the instructor's console 12 is shown in Fig. 2. The panel 20 is sectionalized, the position of the various components being designed to facilitate the instructor's task.

The central section 22 supports the monitoring charts 24 and the instructor's set-up charts 26 which are bound together in a loose-leaf type of arrangement so that they may be turned. Each chart is numbered and each represents a specific operational procedure. The monitoring charts 24 contain the specific steps or actions a student must take to properly perform the procedure named at the top of the chart. Examples of procedures are "Interior Check Procedure," "Starting Engine Procedure," "Takeoff Procedure," etc.

Each instructor's set-up chart 26 lists the steps which the instructor must take to prepare the trainer for the given procedure and presents any other information the instructor should have.

A table toward the bottom of the set-up chart 26 lists the steps the instructor must follow to introduce specific system malfunctions and emergencies in the trainer 16. For example, the table informs the instructor of the actions he must take to simulate a failure in the air pressure system, the actions the student must take when he discovers the failure, and the action the instructor must take to return conditions to normal.

A group of indicator lamps 40 are arranged in vertical array at the left edge of the monitoring charts 24. These lamps 40 are connected in circuits which are energized by manipulation of the controls in the trainer 16. Arrows at the left of specific steps listed on the monitoring charts 24 point to the lamps 40 which should light if the student performs the procedure correctly.

The left hand section 42 of the control panel 20 contains a chart selector or procedure selector switch 44. The switch 44 is a multi-wafer, multi-contact rotary switch. Each wafer represents a different one of the lamps 40 and each position on the procedure switch 44 corresponds to a specific procedure. For example, if the "Interior Check Procedure" is desired, the instructor would turn to the number 1 charts and would turn the procedure selector switch to position 1.

An indicator-lamp test switch 46 is located above the procedure switch 44 on the left-hand section 42. Depressing this button switch energizes all indicator lamps 40 simultaneously, thereby assuring that all lamps are operating properly.

A throttle position indicator 48, located above the lamp test button 46, comprises a meter responsive to movements of the trainer's throttle control. It enables the instructor to continuously monitor the position of the throttle and note its rate of movement.

A section, called the push-pull quadrant section 50 is located below the center section 22. This panel is shaped like a quarter-circle and contains a number of rectangular slots 52 through each of which extends a different control lever 54. In this particular embodiment, nine control levers 54 are employed. The levers 54 can be rotated in a fore-and-aft or push-pull type of motion, thereby introducing direct pointer movement on the instruments in the trainer cockpit, e.g., air pressure, hydraulic main control, fuel balance control, etc. Each lever 54 controls a different instrument. In trainers in which the instruments are actuated by mechanical means, the pointers of the instruments may be spring loaded and controlled by cables, e.g., stainless steel nylon-covered flexible cables, attached to their respective control levers 54 on the push-pull quadrant panel 50.

Alternatively, where the instruments in the ground trainer are electrically actuated, each lever 54 may be coupled mechanically to the moving arm of a potentiometer which is connected to a source of electrical power. A voltage corresponding to the position of the lever 54 may then be derived from the moving arm and applied to the input terminals of the instrument associated with the lever 54.

Each control lever 54 is identified by a letter and is topped by a knob. The knobs are colored differently and contain different embossed designs, such as a straight bar, a triangle, etc., thus permitting an instructor to familiarize himself with the controls very quickly and thereafter to manipulate the controls without having to divert his attention from the student.

A calibrated scale is inscribed alongside each control lever 54 so that the instructor can position the lever 54 at a desired calibration point. In addition, fixed mechanical preset stops 56 are provided at the positions corresponding to normal instrument readings. A reset knob (E) is provided to reset all levers 54 to zero position.

A right-hand section 70 of the control panel 20 mounts a group of twenty electrical toggle switches called malfunction switches 72. These switches 72 introduce malfunctions and emergencies into the various simulated aircraft systems in the trainer and also operate the trainer 16. In the present embodiment of the invention, the toggle switches numbered from 1 to 17 introduce malfunctions into the aircraft systems and those from 18 to 20 operate various trainer components. The malfunction switches 72 can be operated silently, thus preventing the student from being cued to the introduction of a malfunction or failure.

As a typical example of a malfunction which may be introduced, the instructor can place the "flame-out" switch 74 in the "flame-out" position at any time after the aircraft is airborne. This action reduces the indication on the engine r.p.m meter in the trainer 16 to 15% r.p.m., a simulation of "windmilling" r.p.m.

One type of ground trainer, which may be employed in conjunction with the present instructor's control console, is fully described in a patent for a "Ground Trainer for Training Aircraft Crew Members" granted to J. J. Lukacs et al. on December 12, 1950, Serial No. 2,533,484. Circuits utilized therein for the introduction of trouble in the trainer may also be utilized herein in connection with the malfunction switches 72.

*Indicator lamp switching system*

The indicator lamp switching system shown in block form in Fig. 3 may be considered to comprise three basic sections, an activator section 80, a switching section 82 and an indicator lamp section 106. The switching section 82 may be further subdivided into a patchcord switching assembly 84 and the procedure selector switch 44.

The patchcord switching assembly 84 comprises two sections in the preferred embodiment, which may be designated as a major patchcord assembly 86 and a minor patchcord assembly 88. Employment of the latter results in increased switching flexibility, although it may be entirely eliminated, if desired.

The major patchcord assembly 86 consists of vertical and horizontal arrays of banana jack sockets 90 in which banana jack plugs 102 may be inserted. For the sake of simplicity, only enough of the elements of he switching assembly 84 are shown to permit full understanding of its structure and function. Of course, other types of switching devices, such as rotary switches, may be substituted for the major and for minor patchcord assemblies 86 and 88, although the types shown are preferred because of the great flexibility they afford.

In the major patchcord assembly 86, each socket 90 in a vertical row, e.g., row A, is connected to its correspondingly numbered contact on one wafer, e.g., wafer A, of the procedure selector switch 44. Thus, all banana jack sockets 90 in a particular vertical row are associated with a particular wafer and therefore a particular indicator lamp 40, and all sockets 90 in a particular horizontal row are associated with a particular position of the procedure selector switch 44 and therefore a particular chart and procedure. In the embodiment described herein, there are eleven indicator lamps 40 and vertical rows (A-K) and ten procedures and horizontal rows.

The activator section 80 may comprise a number of microswitches, each associated with a different one of the controls in the trainer 16, and located so that operation of the control causes the microswitch to close.

Or, as illustrated in Fig. 4, the controls in the trainer 16, e.g., the engine master switch 92, may be connected in circuit with relays 94. Operation of the control 92 energizes the relay 94, thereby closing a pair of its contacts 96 and 98 and applying voltage from a 24 volt D.C. power supply to one group of "banana" jack sockets 100 in the minor patchcord assembly 88. The maximum number of sockets 100 which are connected together correspond to the maximum number of procedures in which the particular action forms a step (e.g., the maximum number of procedures in which the student must turn on the engine master switch). Patchcords, comprising a wire having a banana jack plug 104 and 102 affixed at each end, interconnect the minor patchcord assembly 88 and the proper sockets 90 on the major patchcord assembly 86. As may be seen, the action of switching on the engine master switch may be a step in the fourth procedure indicated by lamp A and a step in the first procedure indicated by lamp C.

The indicator lamp section 106 includes a number of indicator lamps 40, each associated with its own holding relay 108 and uni-directional conductor 112, which may be a germanium crystal for example.

In a simpler form of indicator switching assembly, the relays 94 and 108 and the unidirectional conductor 112 may be omitted. Turning the engine master switch 92 to the "on" position could cause current to flow from the 24 volt D.C. source through the engine master switch 92, the socket 100, the plug 104, the plug 102, socket number 4 of vertical array A in the major patchcord assembly 86, contact 4 on wafer A of the procedure selector switch 44 and indicator lamp A.

In the circuit shown in Fig. 4, turning the master engine switch 92 to the "on" position energizes the relay 94, closing contacts 96 and 98 thereby applying 24 volt D.C. power to the socket 100. The patch of the current is then the same as previously described until it leaves the procedure selector switch 44. It then passes through the unidirectional conductor 112 and energizes the holding relay 108. This closes the normally open set of contacts 110 and applies 24 volt D.C. power to the relay coil 108 through a wafer L of the procedure selector switch 44. Thus, the relay 108 continues to be energized even if the engine master switch 92 is turned to its "off" position, or one of the patchcord connections is broken. To de-energize the holding relay 108, it is necessary to rotate the procedure selector switch 44 momentarily to a position intermediate two contact points, as would be the case when rotating to another position. This breaks the 24 volt power circuit at the moving arm of wafer L.

The unidirectional conductor 112 prevents the 24 volt D.C. power coming through wafer L from feeding back to the original activating circuit in the trainer 16.

Energization of the holding relay coil 108 also closes a second set of normally open contacts 114, thereby applying 24 volt D.C. power to the indicating lamp 40A and lighting it.

It should be noted that, regardless of the position of the procedure selector switch 44, the positive D.C. potential is continuously applied to one side of the second set of contacts 114 of all the holding relays 108. The other side of each set is connected through lamp 40 to ground. Thus, by shorting out this second set of contacts 114, power can be applied to the lamp 40. This is done simultaneously to all the holding relay contacts 114 by means of a multi-contact button switch called the indicator lamp test switch 46. By means of this switch 46, the continuity of all the indicator lamps 40 can be simultaneously checked.

What is claimed is:

A switching circuit operable with a procedure trainer cockpit controls and instructor console indicator lamps comprising a first patchcord assembly having in banks of *n* rows of patchcord sockets, wherein *m* is equal to the number of procedural steps a trainee must perform, a second patchcord assembly operable with said cockpit controls and said patchcord sockets through a network of patchcords, and a wafer switch having *m* wafers of *n* contacts, each of said *m* wafers being operable with one of said *m* banks of patchcord sockets and said *n* contacts being operable with said *n* rows of patchcord sockets through a network of patchcords, said wafers each being operable with a separate console indicator lamp.

References Cited in the file of this patent
UNITED STATES PATENTS

| | | |
|---|---|---|
| 1,476,671 | Crate | Dec. 4, 1923 |
| 1,564,138 | Rowland | Dec. 1, 1925 |
| 1,810,826 | Gray | June 16, 1931 |
| 2,084,440 | Heinis | June 22, 1937 |
| 2,085,920 | McCoy | July 6, 1937 |
| 2,178,903 | Cole | Nov. 7, 1939 |
| 2,260,432 | Brown | Oct. 28, 1941 |
| 2,533,484 | Lukacs et al. | Dec. 12, 1950 |
| 2,700,227 | Arkell et al. | Jan. 25, 1955 |